United States Patent
Wang et al.

(10) Patent No.: US 11,776,189 B2
(45) Date of Patent: Oct. 3, 2023

(54) SYSTEMS FOR GENERATING DIGITAL OBJECTS TO ANIMATE SKETCHES

(71) Applicant: Adobe Inc., San Jose, CA (US)

(72) Inventors: Zeyu Wang, New Haven, CT (US); Yangtuanfeng Wang, London (GB)

(73) Assignee: Adobe Inc., San Jose, CA (US)

(*) Notice: Subject to any disclaimer, the term of this patent is extended or adjusted under 35 U.S.C. 154(b) by 99 days.

(21) Appl. No.: 17/507,983

(22) Filed: Oct. 22, 2021

(65) Prior Publication Data
US 2023/0126250 A1     Apr. 27, 2023

(51) Int. Cl.
*G06T 13/40*     (2011.01)
*G06F 18/214*     (2023.01)
*G06N 3/045*     (2023.01)

(52) U.S. Cl.
CPC ............ *G06T 13/40* (2013.01); *G06F 18/214* (2023.01); *G06N 3/045* (2023.01)

(58) Field of Classification Search
CPC ............ G06T 13/40; G06T 19/20; G06T 2207/20084; G06T 17/00; G06F 18/214; G06N 3/045; G06N 3/08; G06N 20/00; G06V 10/82; G06V 10/764; G06V 10/72
See application file for complete search history.

(56) References Cited

U.S. PATENT DOCUMENTS

2019/0228115 A1* 7/2019 Bergin .................... G06N 5/022
2019/0317739 A1* 10/2019 Turek ..................... G06N 3/045
2021/0165561 A1* 6/2021 Wei ........................ G06T 19/20
2022/0130078 A1* 4/2022 Maheshwari ......... G06T 11/001
2022/0375024 A1* 11/2022 Luo ....................... G06T 3/0012

OTHER PUBLICATIONS

Benard, Pierre et al., "Stylizing animation by example", ACM Transactions on Graphics, vol. 32 No. 4 [retrieved Sep. 20, 2021], Retrieved from the Internet <https://hal.inria.fr/hal-00816143v2/document>., Jul. 21, 2013, 12 pages.

Canny, John , "A Computational Approach to Edge Detection", IEEE Transactions On Pattern Analysis and Machine Intelligence, vol. PAMI-8, No. 6 [retrieved Sep. 20, 2021], Retrieved from the Internet <https://doi.org/10.1109/TPAMI.1986.4767851>., Nov. 1986, 20 Pages.

(Continued)

*Primary Examiner* — Xilin Guo
(74) *Attorney, Agent, or Firm* — FIG. 1 Patents

(57) ABSTRACT

In implementations of systems for generating digital objects to animate sketches, a computing device implements a sketch system to receive input data describing a user sketched digital object having a pose and a non-photorealistic style. The sketch system generates a latent vector representation of the user defined non-photorealistic style using an encoder of a generative adversarial network. A digital object is generated having the pose and a non-photorealistic style using a generator of the generative adversarial network based on the latent vector representation of the user defined non-photorealistic style. The sketch system modifies the latent vector representation of the user defined non-photorealistic style based on a comparison between the user defined non-photorealistic style and the non-photorealistic style.

20 Claims, 14 Drawing Sheets

(56) References Cited

OTHER PUBLICATIONS

Decarlo, Doug et al., "Suggestive contours for conveying shape", SIGGRAPH '03: ACM SIGGRAPH 2003 Papers [retrieved Sep. 20, 2021], Retrieved from the Internet <https://citeseerx.ist.psu.edu/viewdoc/download?doi=10.1.1.122.788&rep=rep1&type=pdf>., Jul. 2003, 8 Pages.

Jamriška, Ondřej et al., "Stylizing Video by Example", ACM Transactions on Graphics, vol. 38 No. 4 [retrieved Sep. 20, 2021], Retrieved from the Internet <https://dcgi.fel.cvut.cz/home/sykorad/Jamriska19-SIG.pdf>Jul. 12, 2019, 11 Pages.

Judd, Tilke et al., "Apparent ridges for line drawing", ACM Transactions on Graphics, vol. 26, No. 3 [retrieved Sep. 20, 2020], Retrieved from the Internet <https://www.cct.lsu.edu/~fharhad/ganbatte/siggraph2007/CD2/content/papers/019-judd.pdf>., Jul. 29, 2007, 8 Pages.

Liu, Difan et al., "Neural Contours: Learning to Draw Lines From 3D Shapes", Cornell University, arXiv Prepring, arXiv.org [retrieved Sep. 20, 2021], Retrieved from the Internet <https://arxiv.org/pdf/2003.10333.pdf>., Mar. 2020, 12 Pages.

Ohtake, Yutaka et al., "Ridge-Valley Lines on Meshes via Implicit Surface Fitting", SIGGRAPH '04 ACM SIGGRAPH 2004 [retrieved Sep. 20, 2020], Retrieved from the Internet <https://citeseerx.ist.psu.edu/viewdoc/download?doi=10.1.1.79.7008&rep=rep1&type=pdf>., Aug. 1, 2004, 4 Pages.

Texler, Ondřej et al., "Interactive video stylization using few-shot patch-based training", ACM Transactions on Graphics, vol. 39, No. 4 [retrieved Sep. 20, 2021], Retrieved from the Internet <https://arxiv.org/pdf/2004.14489.pdf>., Jul. 8, 2020, 11 Pages.

Wang, Zeyu et al., "Tracing Versus Freehand for Evaluating Computer-Generated Drawings", ACM Transactions on Graphics, vol. 40, No. 4, Article 52. [retrieved Sep. 20, 2021], Retrieved from the Internet <https://graphics.cs.yale.edu/sites/default/files/tracing-vs-freehand_0.pdf>., Jul. 19, 2021, 12 Pages.

Xie, Saining et al., "Holistically-Nested Edge Detection", Cornell University, arXiv Preprint, arXiv.org [retrieved Sep. 20, 2021], Retrieved from the Internet <https://arxiv.org/pdf/1504.06375.pdf>., Oct. 4, 2015, 10 pages.

\* cited by examiner

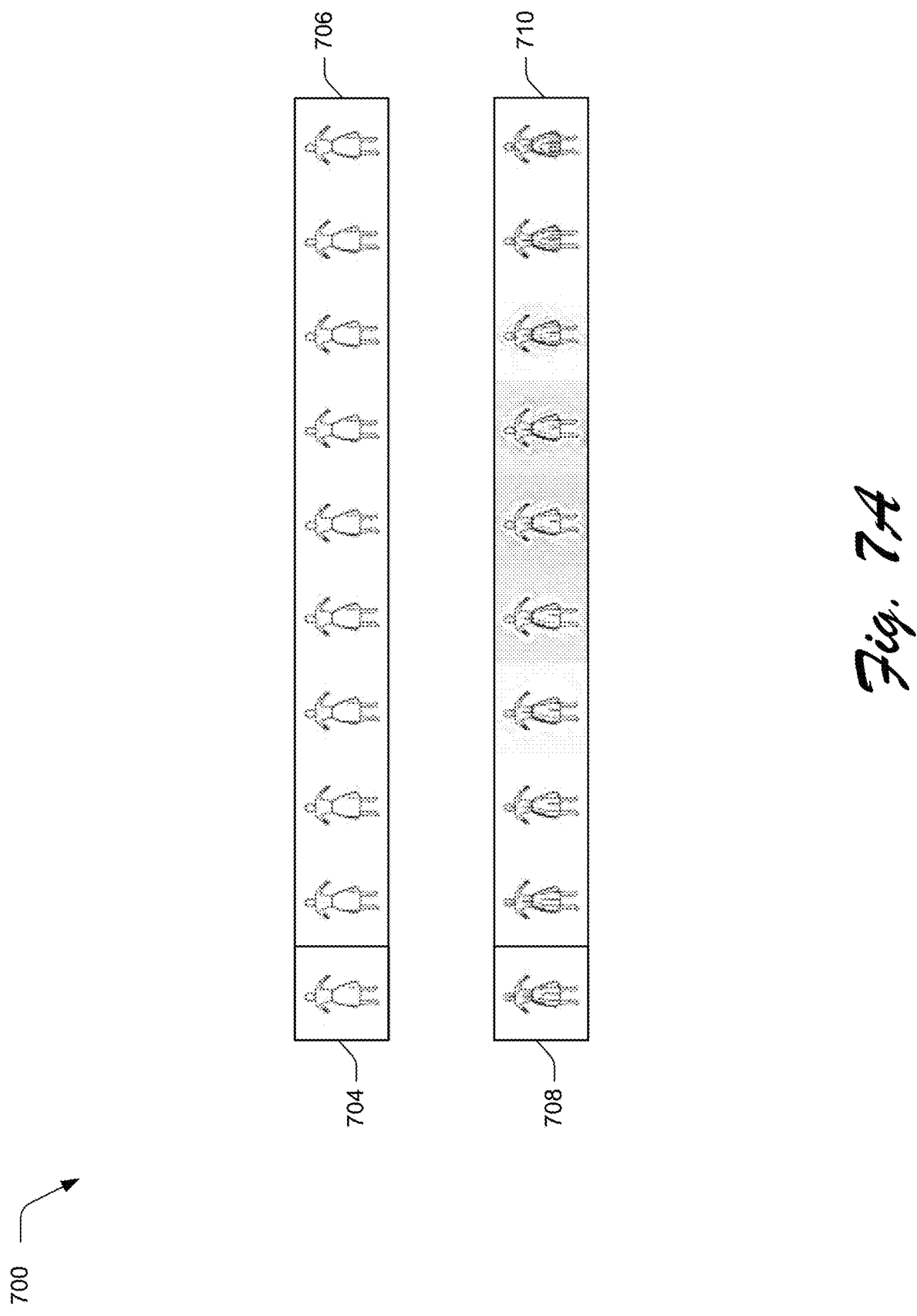

SYSTEMS FOR GENERATING DIGITAL OBJECTS TO ANIMATE SKETCHES

BACKGROUND

Digital sketches are useful in preliminary stages of animation development because they are capable of expressing both style and dynamics. For instance, a digital artist interacts with an input device (e.g., a mouse, a stylus, a touchscreen, etc.) relative to a user interface to sketch digital objects for one or two digital frames to use in a storyboard as part of the animation development. However, this utility does not extend to the process of generating many digital frames for creating animated content as each of the many digital frames would need to be sketched, e.g., by the digital artist, which is tedious and prone to human error.

Non-photorealistic rendering is one technique for automatically generating a digital image that depicts an object which appears to be sketched as opposed to appearing to be photorealistic. Conventional non-photorealistic rendering systems use a three-dimensional geometry (e.g., a three-dimensional mesh) to generate an image depicting a two-dimensional non-photorealistic object. In order to use conventional non-photorealistic rendering systems for animation, a user generates a first digital frame depicting the non-photorealistic object in a first position from a three-dimensional mesh having vertices in a first orientation.

The user then manipulates the vertices of three-dimensional mesh such that the vertices are in a second orientation and generates a second digital frame depicting the non-photorealistic object in a second position. By combining the first and second digital frames with additional digital frames generated by further manipulating the three-dimensional mesh, it is possible to animate the non-photorealistic object. However, conventional non-photorealistic rendering techniques are rigid with respect to style and these techniques are not suitable for animating sketches that have various user defined styles.

SUMMARY

Techniques and systems are described for generating digital objects to animate sketches. In an example, a computing device implements a sketch system to receive input data describing a user sketched digital object having a pose and a user defined non-photorealistic style. The sketch system generates a latent vector representation of the user defined non-photorealistic style using an encoder of a generative adversarial network.

For example, the sketch system generates a digital object having the pose and a non-photorealistic style using a generator of the generative adversarial network based on the latent vector representation of the user defined non-photorealistic style. The latent vector representation of the user defined non-photorealistic style is modified based on a comparison between the user defined non-photorealistic style and the non-photorealistic style. In one example, the sketch system does not modify weights of the generative adversarial network learned from training the generative adversarial network on training data as part of modifying the latent vector representation of the user defined non-photorealistic style.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 7A and 7B illustrate examples of generating digital objects to animate sketches.

DETAILED DESCRIPTION

Overview

Figure 1:
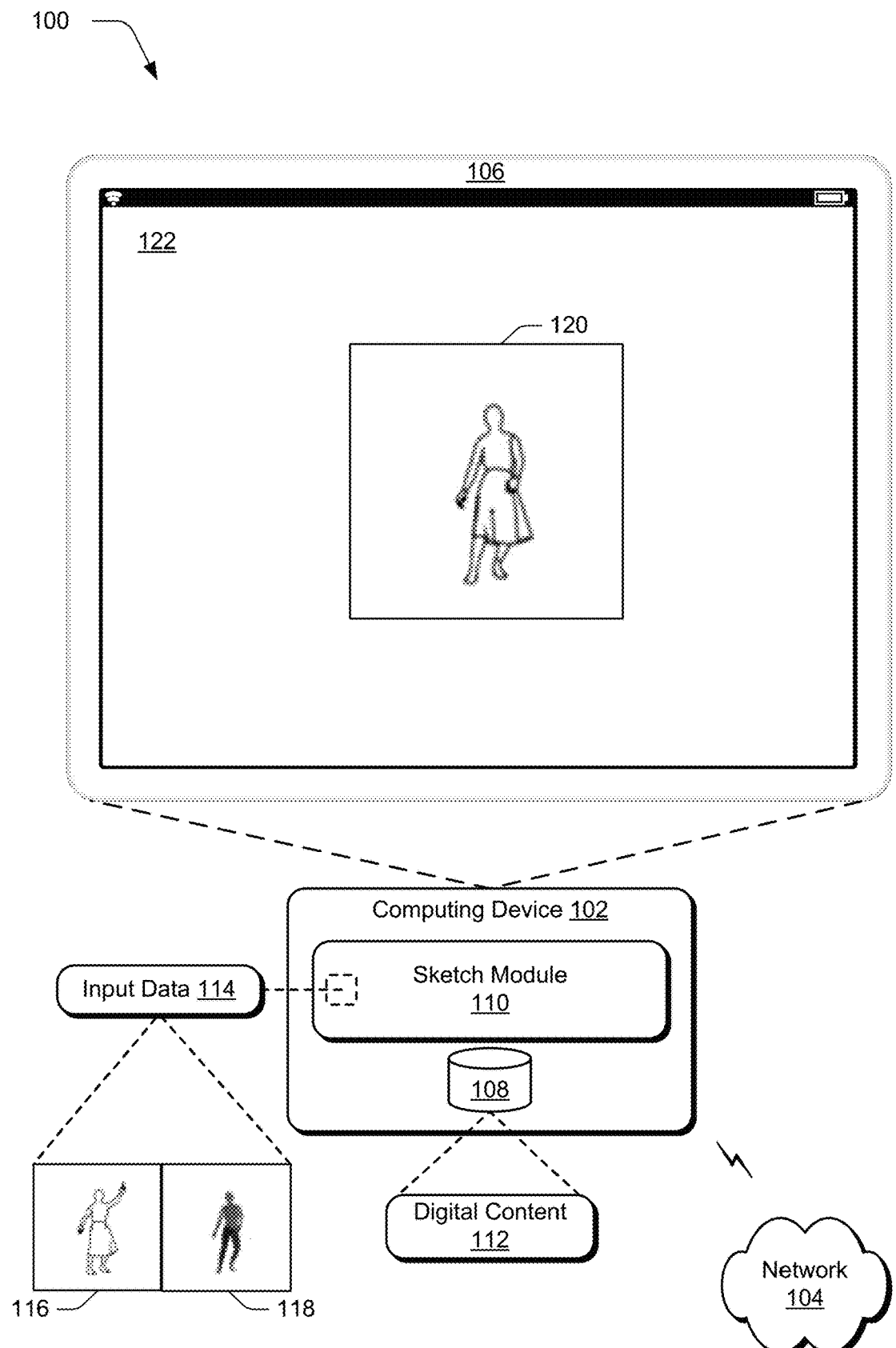
FIG. 1 is an illustration of an environment in an example implementation that is operable to employ digital systems and techniques for generating digital objects to animate sketches as described herein.

Conventional systems for automatically generating digital frames depicting non-photorealistic objects do so by generating one digital frame at a time. For example, after generating one digital frame, a user manipulates a three-dimensional mesh and generates another digital frame in a rigid non-photorealistic style that is challenging for the user to control. In order to overcome the limitations of conventional systems, techniques and systems are described for generating digital objects to animate sketches. In one example, a computing device implements a sketch system to receive input data describing a user sketched digital object having a pose and a user defined non-photorealistic style. The sketch system generates a latent vector representation of the pose using a first encoder network of a generative adversarial network and generates a latent vector representation of the user defined non-photorealistic style using a second encoder network of the generative adversarial network.

The generative adversarial network is trained on training data included in a synthetic dataset to receive a first digital object having a first pose and a first non-photorealistic style and a second digital object having a second pose and a second non-photorealistic style as an input and generate a new digital object having the first pose and the second non-photorealistic style as an output. For example, the dataset includes synthetic sketches of 15000 poses of an animated character which include contours, suggestive contours, ridges and valleys, apparent ridges, and so forth. The training data includes a 9-channel map for each pose containing geometry-space features (e.g., UV, depth, surface normal, and curvatures) and image-space features (e.g., non-photorealistic renderings).

The generative adversarial network is trained on the training data to minimize a reconstruction loss function that includes L1, VGG, GAN, and Patch terms in one example. The generative adversarial network is also trained using siamese training to minimize a contrastive loss function. After training the generative adversarial network using the siamese training, the first and second encoder networks generate similar latent vector representations for digital objects having similar non-photorealistic styles regardless of differences between poses of the digital objects.

The sketch system generates a digital object having the pose and a non-photorealistic style using a generator network of the trained generative adversarial network based on the latent vector representation of the pose and the latent vector representation of the user defined non-photorealistic style. For example, the sketch system compares the user defined non-photorealistic style and the non-photorealistic style by comparing the user sketched digital object described by the input data with the digital object. A loss is computed between the user defined non-photorealistic style and the non-photorealistic style, and the sketch system modifies the latent vector representation of the user defined non-photorealistic style to minimize this loss.

In an example, the sketch system optimizes the latent vector representation of the user defined non-photorealistic style such that the generator network of the trained generative adversarial network generates an additional digital object as having a non-photorealistic style that is visually similar to the user defined non-photorealistic style. By optimizing the latent vector representation of the user defined non-photorealistic style in this manner, the described systems are capable of generating digital objects which propagate a user defined non-photorealistic style across multiple different poses to animate the digital objects. For instance, the described systems receive input data describing a user sketched digital object depicting a character relative to a keyframe, and the sketch system propagates a non-photorealistic style of the user sketched digital object to many other frames to animate the character automatically. The described systems are also capable of interpolating between a pair of user sketched digital objects to generate new digital objects which is not possible using conventional systems.

Term Examples

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, the term "pose" of a digital object refers to a posture of the digital object, a shape of the digital object, or a positioning of portions of the digital object relative to other portions of the digital object. Examples of poses of a digital object included sitting, standing, running, walking, arms raised, facing forward, turned around, and so forth. By way of example, different poses of a digital object are representable by changing positions of vertices of a three-dimensional mesh of the digital object.

As used herein, the term "style" of a digital object refers to a visual appearance of the digital object in a particular pose. Examples of styles of a digital object include colored, black and white, shaded, unshaded, photorealistic, non-photorealistic, etc. By way of example, different styles of a digital object are representable by changing a visual appearance of the digital object in a particular pose. By way of further example, a digital object having a particular pose is capable of having many different styles applied to the particular pose.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a sketch module 110. The storage device 108 is illustrated to include digital content 112 such as digital photographs, digital images, digital videos, etc.

The sketch module 110 is illustrated as having, receiving, and/or transmitting input data 114. In general, the input data 114 describes digital objects which have a pose and a style. In the illustrated example, the input data 114 describes a first digital object 116 and a second digital object 118. As shown, the first digital object 116 is a humanlike character having a first pose with both feet pointing in a same direction and one arm raised with the other arm down and slightly extended from the character's torso. The raised arm includes an extended finger in what appears to be a "number one" gesture.

The first digital object 116 has a first style which is non-photorealistic and includes a dress or a kilt worn by the humanlike character. This style is defined using dark lines for boundaries which are filled using a single light color (e.g., white). For instance, the dark lines also define a texture for the dress worn by the humanlike character.

The second digital object 118 is also a humanlike character. This humanlike character has a second pose with each foot pointing in a different direction and having both arms down. One of the character's arms is slightly extended from the character's torso and the other arm is partially oriented in front of the character's waist. The second digital object 118 is illustrated as a UV map. For instance, colors of the second digital object 118 represent UV coordinates of a point on a three-dimensional surface. In this manner, the UV map characterizes a three-dimensional geometry, for example, corresponding to the second pose.

The sketch module 110 processes the input data 114 to generate a new digital object 120 that has the pose of the second digital object 118 and the style of the first digital object 116. As illustrated in FIG. 1, the new digital object 120 is rendered in a user interface 122 of the display device 106. To generate the new digital object 120 in one example, the sketch module 110 leverages a generative adversarial network. For example, the generative adversarial network is trained on training data to receive a first digital object having a first pose and a first non-photorealistic style along with a second digital object having a second pose and a second non-photorealistic style as an input and generate a new digital object having the first pose and the second non-photorealistic style as an output.

To do so, the sketch module 110 processes an image depicting the second digital object 118 using a first encoder network of the generative adversarial network. For example, the first encoder network includes a fully convolutional network. The first encoder network generates a latent vector representation of the pose of the second digital object 118 for receipt by a generator network of the generative adversarial network. For example, the sketch module 110 processes an image depicting the first digital object 116 using a second encoder network of the generative adversarial network, and the second encoder network generates a latent vector representation of the style of the first digital object 116 for receipt by the generator network. In one example, the second encoder network also includes a fully convolutional network.

The generator network of the generative adversarial network receives the latent vector representation of the pose of the second digital object 118 and the latent vector representation of the style of the first digital object 116 and processes these latent vector representations to generate the new digital object 120. For example, the generative adversarial network is trained using siamese training to minimize a contrastive loss function. Based on this training, the generative adversarial network learns to encode vector representations of digital objects such that similar styles of the digital objects are encoded similarly regardless of corresponding poses of the digital objects. In one example, the generative adversarial network is also trained to minimize a reconstruction loss function during which the generative adversarial network learns to reconstruct input images. For instance, the sketch module 110 generates the new digital object 120 by processing the input data 114 using the trained generative adversarial network.

Figure 2:
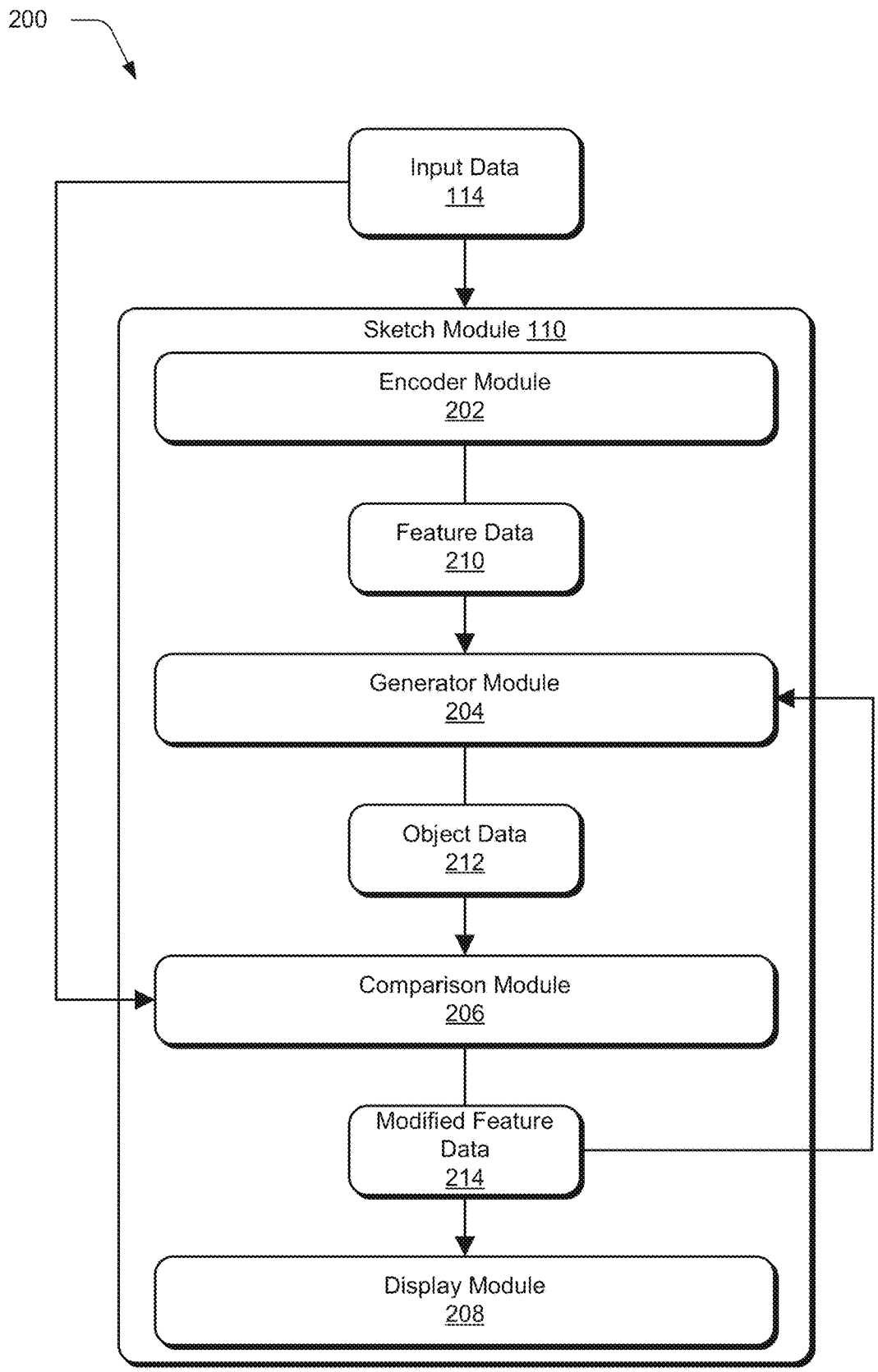
FIG. 2 depicts a system in an example implementation showing operation of a sketch module for generating digital objects to animate sketches.

FIG. 2 depicts a system 200 in an example implementation showing operation of a sketch module 110. The sketch module 110 is illustrated to include an encoder module 202, a generator module 204, a comparison module 206, and a display module 208. For instance, the encoder module 202 receives input data 114 which describes digital objects having poses and styles and the encoder module 202 processes the input data to generate feature data 210.

Figure 3:
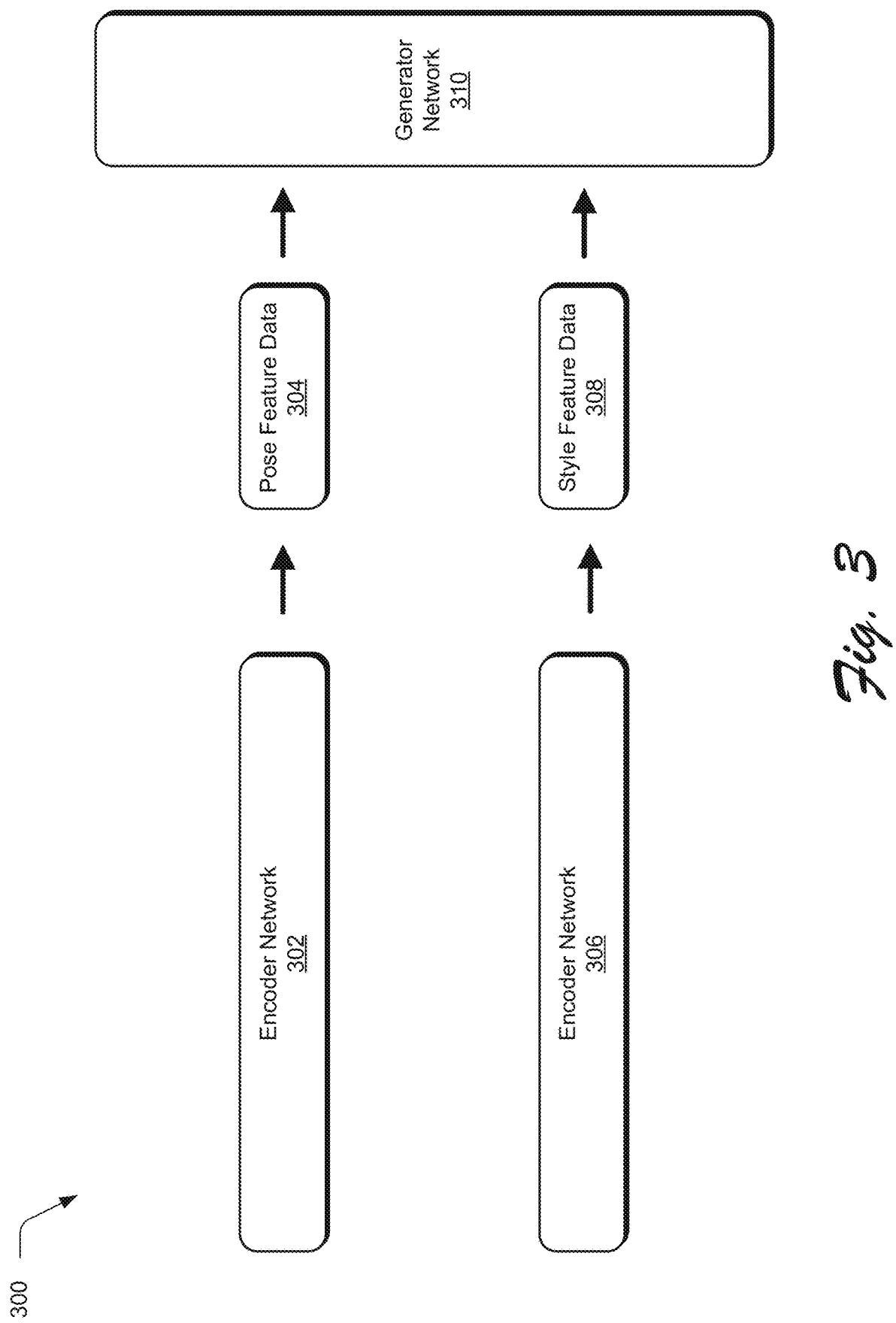
FIG. 3 is an illustration of a generative adversarial network.

FIG. 3 is an illustration of a generative adversarial network 300. In a broad example, the generative adversarial network 300 is a machine learning model or a network of machine learning models. In a narrow example, the generative adversarial network 300 is a network as described by Sarkar et al., *Style and Pose Control for Image Synthesis of Humans from a Single Monocular View*, arXiv: 2102.11263v1 [cs.CV] (Feb. 22, 2021). For example, the sketch module 110 includes the generative adversarial network 300.

As shown, the generative adversarial network 300 includes an encoder network 302 which is illustrated as generating pose feature data 304. For example, the encoder network 302 includes a fully convolutional network and the pose feature data 304 describes a latent vector representation of a pose of a digital object described by the input data 114. The generative adversarial network 300 also includes an encoder network 306 which is shown as generating style feature data 308. In one example, the encoder network 306 includes a fully convolutional network and the style feature data 308 describes a latent vector representation of a style of a digital object described by the input data 114. For instance, the encoder network 306 is included in the encoder module 202.

Figure 4A:
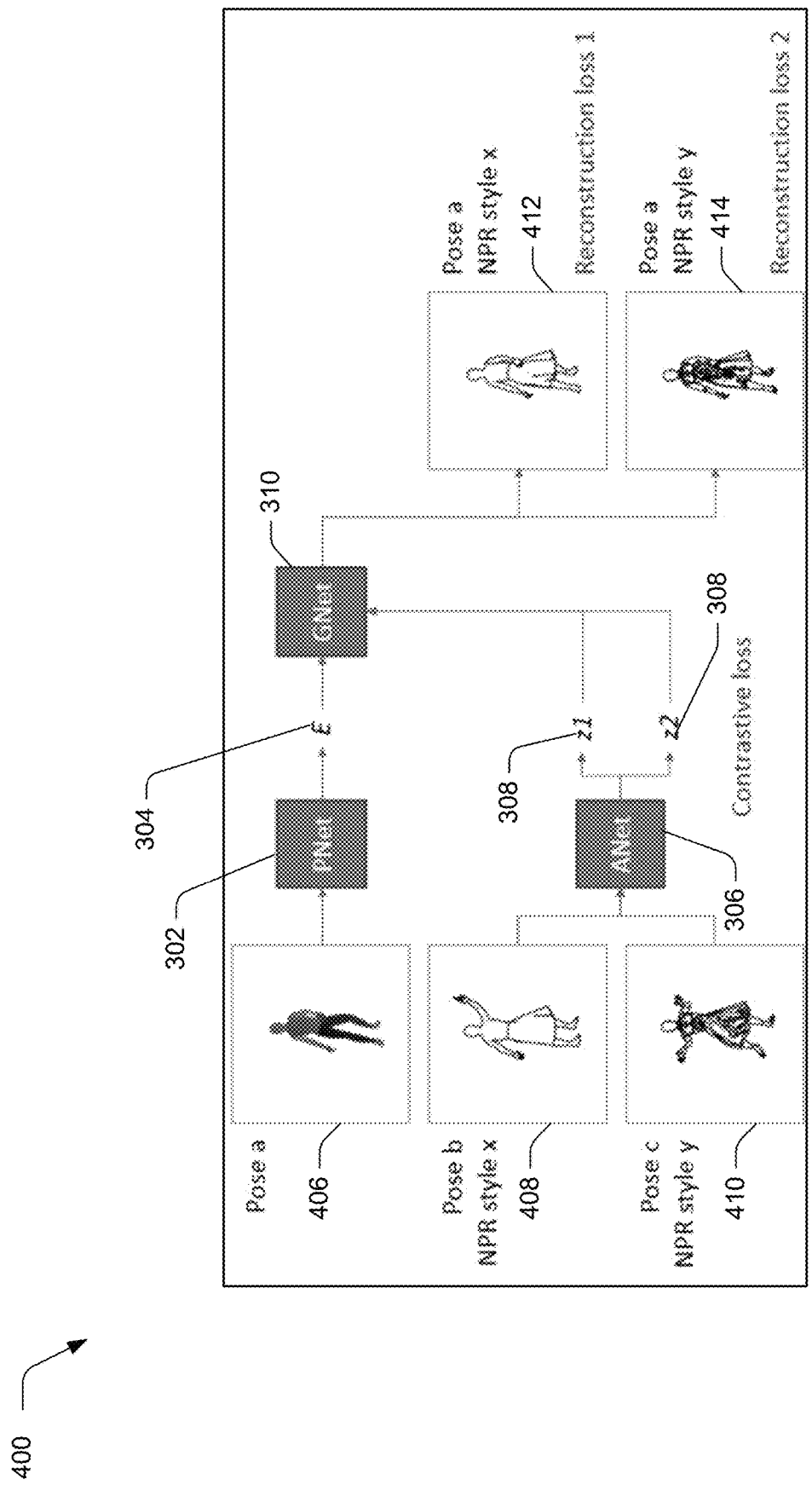
FIGS. 4A, 4B, and 4C illustrate an example of training a generative adversarial network using contrastive loss and reconstruction loss.
Figure 4B:
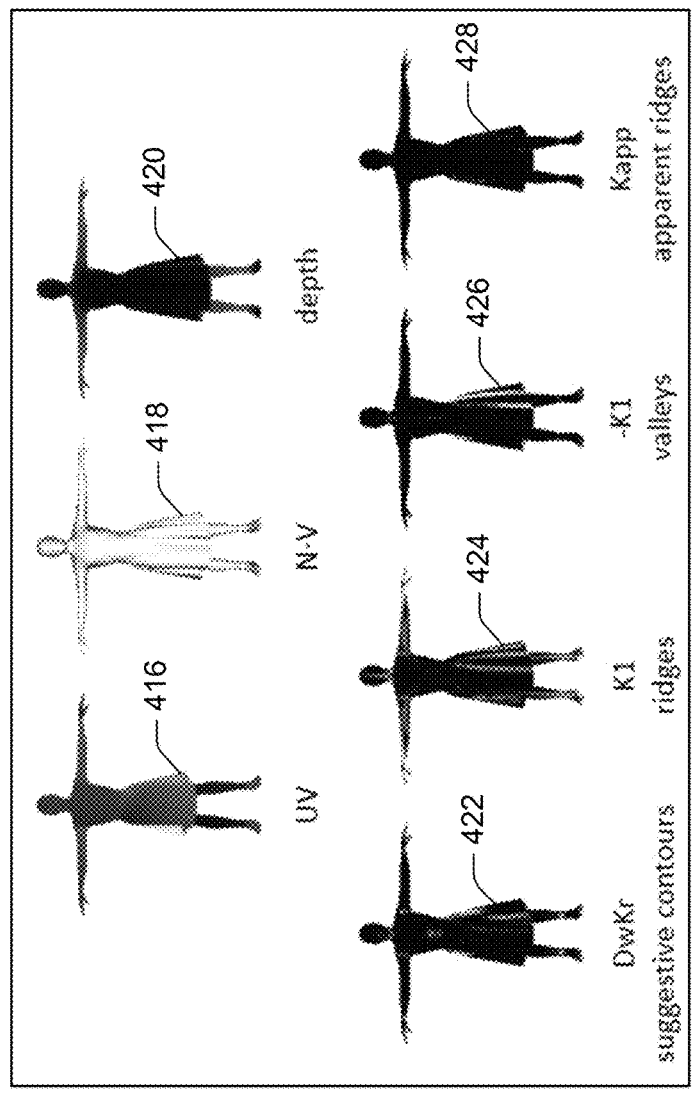
Figure 4C:
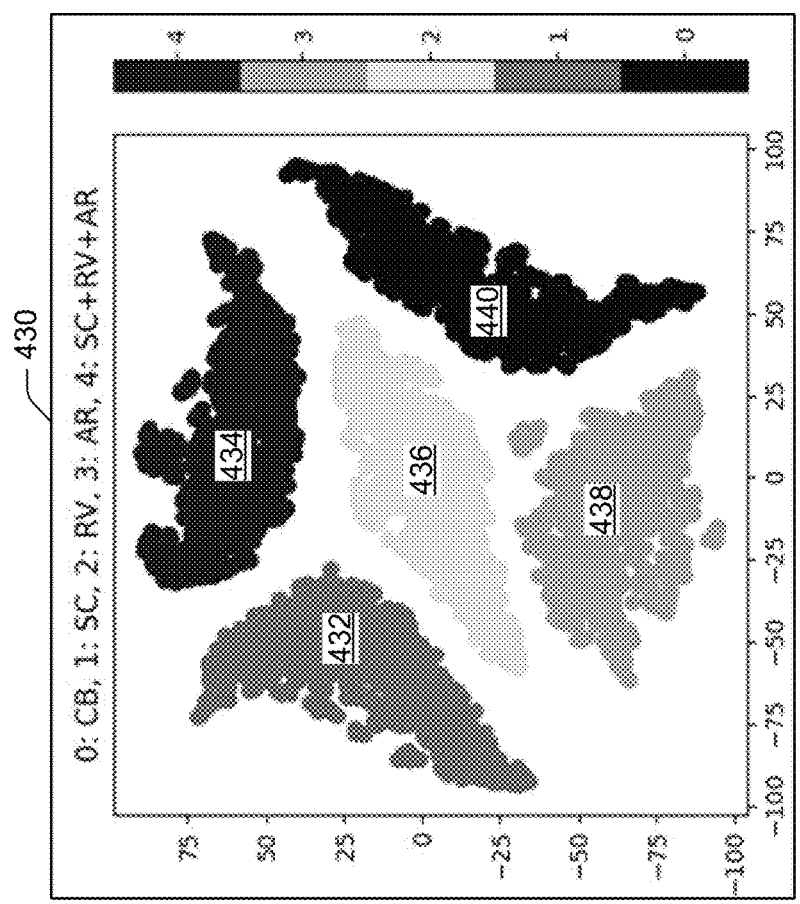

A generator network 310 of the generative adversarial network 300 is illustrated as receiving the pose feature data 304 and the style feature data 308. The generator network 310 processes the pose feature data 304 and the style feature data 308 to generate a new digital object having a pose that is visually similar to a pose of a digital object processed by the encoder network 302 to encode the pose feature data 304 and a style that is visually similar to a style of a digital object processed by the encoder network 306 to encode the style feature data 308. FIGS. 4A, 4B, and 4C illustrate an example of training a generative adversarial network 300 using contrastive loss and reconstruction loss.

FIG. 4A illustrates a representation 400 of training and/or using the generative adversarial network 300. FIG. 4B illustrates a representation 402 of training data used to train the generative adversarial network 300. FIG. 4C illustrates a representation 404 of a t-SNE visualization of latent style vectors generated after training the generative adversarial network 300 using siamese training to minimize a contrastive loss function.

As shown in FIG. 4A, the representation 400 includes the generative adversarial network 300 as well as input digital images 406-410. Digital image 406 depicts a digital object having a pose "a" and the encoder network 302 processes the digital image 406 to generate the pose feature data 304. Digital image 408 depicts a digital object having a pose "b" and a non-photorealistic style "x" and the encoder network 306 processes the digital image 408 to generate the style feature data 308. Digital image 410 depicts a digital object having a pose "c" and a non-photorealistic style "y." For example, the encoder network 306 processes the digital image 410 to generate the style feature data 308.

The representation 400 also includes output digital images 412, 414. As shown, the generator network 310 receives the pose feature data 304 which describes a latent vector representation of the pose "a." The generator network 310 also receives the style feature data 308 that describes a latent vector representation of the non-photorealistic style "x." For example, the generator network 310 generates the output digital image 412 based on the pose feature data 304 and the style feature data 308. The output digital image 412 depicts a digital object having the pose "a" and the non-photorealistic style "x."

In a similar example, the generator network 310 receives the pose feature data 304 that describes the latent vector representation of the pose "a." For example, the generator network 310 receives the style feature data 308 which describes a latent vector representation of the non-photorealistic style "y." In this example, the generator network 310 generates the output digital image 414 based on the pose feature data 304 and the style feature data 308. As shown, the output digital image 414 depicts a digital object having the pose "a" and the non-photorealistic style "y."

In the illustrated example, the sketch module 110 has trained the generative adversarial network 300 on training data to generate the output digital images 412, 414 based on the input digital images 406-410. This training includes siamese training for pose and non-photorealistic style disentanglement. For instance, the siamese training minimizes a contrastive loss function. The training also includes reconstruction training which minimizes a reconstruction loss function. In an example, the reconstruction loss function includes L1, VGG, GAN, and Patch terms.

With reference to FIG. 4B, the representation 402 depicts examples of features 416-428 included in training data used to train the generative adversarial network 300. For example, the sketch module 110 generates a synthetic non-photorealistic dataset using techniques described by DeCarlo et al., *Suggestive Contours for Conveying Shape*, ACM Transactions on Graphics (Proc. SIGGRAPH) 22(3): 848-855, July 2003. This generated dataset includes 15000 poses of an animated character illustrated with different types of non-photorealistic lines. The different types of non-photorealistic lines have varying thresholds and include contours, suggestive contours, ridges and valleys, and apparent ridges. For example, the sketch module 110 uses a subset of the 15000 poses of the animated character as training samples for training the generative adversarial network 300. In this example, the sketch module 110 trains the generative adversarial network 300 on pairs of the training samples to generate digital objects.

As part of generating the synthetic non-photorealistic dataset, the sketch module 110 generates a 9-channel map for each pose (e.g., for each training sample) which contains geometry-space features (e.g., UV, depth, surface normal, and curvatures) and image-space features (e.g., non-photorealistic renderings). In this manner, the dataset is generated to include differential property maps corresponding to a three-dimensional geometry in each frame (e.g., each pose of the animated character). The differential property maps include a two-channel UV map 416, N dot V 418, depth 420, and so forth. In one example, the differential property maps include derivatives of radial curvatures, positive first principal curvatures, negative first principal curvatures, and view-dependent curvatures. For example, the differential property maps also include four types of surface curvatures which are used to generate suggestive contours 422, ridges 424, valleys 426, and apparent ridges 428.

With respect to FIG. 4C, the representation 404 includes a t-SNE visualization 430 of latent vectors encoded by the generative adversarial network 300. For example, the style feature data 308 describes the latent vectors included in the t-SNE visualization 430. As shown, the t-SNE visualization 430 depicts clusters 432-440 and each of the clusters 432-440 includes groups of the latent vectors that correspond to digital objects having a same non-photorealistic style but different poses. For example, cluster 432 corresponds to latent vectors generated from digital objects having a first non-photorealistic style, cluster 434 corresponds to latent vectors generated from digital objects having a second non-photorealistic style, cluster 436 corresponds to latent vectors generated from digital objects having a third non-photorealistic style, cluster 438 corresponds to latent vectors generated from digital objects having a fourth non-photorealistic style, and cluster 440 corresponds to latent vectors generated from digital objects having a fifth non-photorealistic style. Because a particular latent vector encoded by the generative adversarial network 300 is included in one of the clusters 432-440 based on a non-photorealistic style of a corresponding digital object regardless of a pose of the corresponding digital object, this property of the latent space is usable to propagate and interpolate between different non-photorealistic styles. This interpolation is possible with respect to a static frame and also across multiple frames as illustrated in FIGS. 5B and 5C, respectively.

Figure 5A:
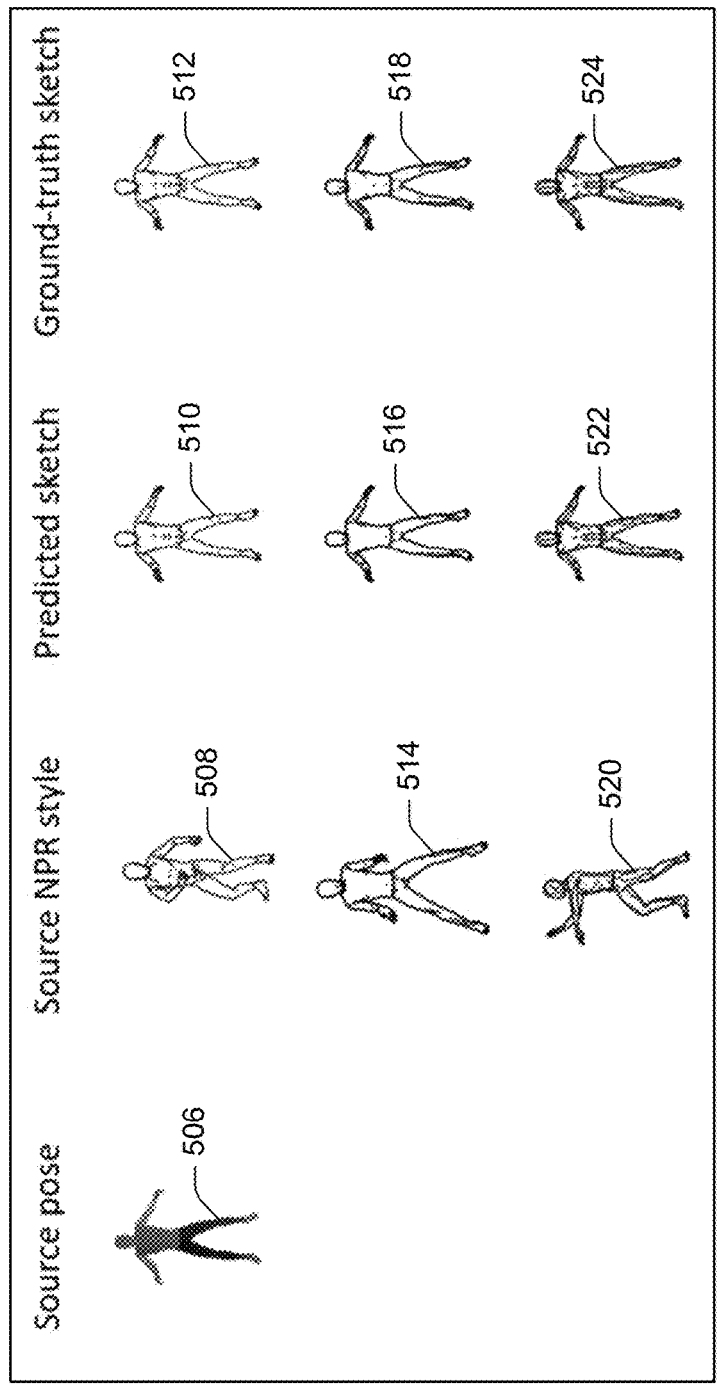
FIGS. 5A, 5B, and 5C illustrate examples of generating digital objects using a generative adversarial network trained on training data to generate the digital objects.
Figure 5B:
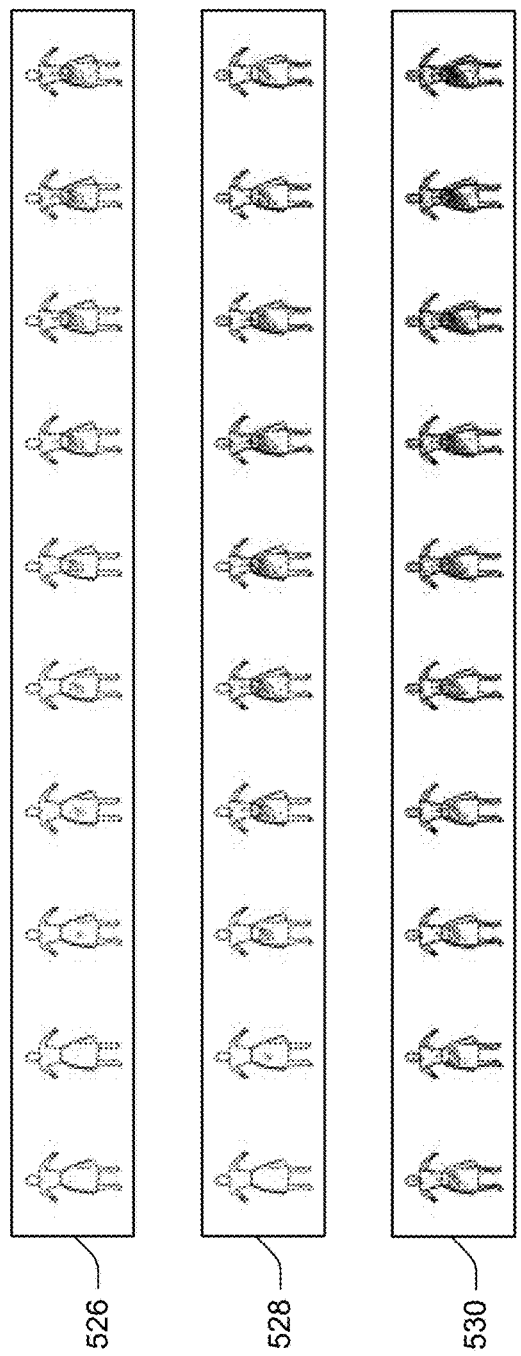
Figure 5C:
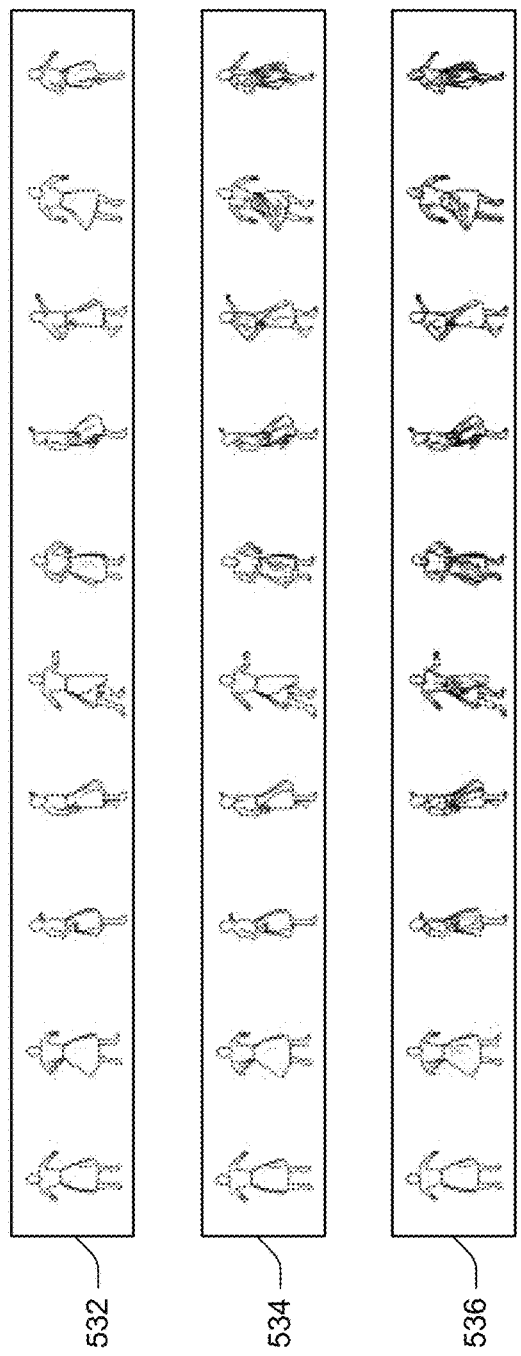

FIGS. 5A, 5B, and 5C illustrate examples of generating digital objects using a generative adversarial network 300 trained on training data to generate the digital objects. FIG. 5A illustrates a representation 500 of digital objects generated based on a source pose and a variety of different non-photorealistic styles. FIG. 5B illustrates a representation 502 of interpolation between non-photorealistic styles on a static frame. FIG. 5C illustrates a representation 504 of interpolation between non-photorealistic styles across multiple frames.

As illustrated, the representation 500 includes a digital object 506 that has a first pose and a first non-photorealistic style. For example, the input data 114 describes a digital image that depicts the digital object 506 and the encoder network 302 processes the input data 114 to generate the pose feature data 304 as describing a latent vector representation of the first pose. The representation 500 also includes a digital object 508 that has a second pose and a second non-photorealistic style. In one example, the input data 114 describes a digital image which depicts the digital object 508. In this example, the encoder network 306 processes the input data 114 to generate the style feature data 308 as describing a latent vector representation of the second non-photorealistic style.

For example, the generator network 310 receives and processes the pose feature data 304 and the style feature data 308 to generate a digital object 510 which has the first pose and the second non-photorealistic style. For instance, the sketch module 110 trains the generative adversarial network 300 on the training data to generate the digital object 510 based on the digital object 506 and the digital object 508. As shown, the digital object 510 is visually similar to a ground truth digital object 512 that has the first pose and the second non-photorealistic style.

The representation 500 includes a digital object 514 that has a third pose and a third photo-realistic style. For example, the input data 114 describes a digital image that depicts the digital object 514 and the encoder network 306 processes the input data 114 to generate the style feature data 308 as describing a latent vector representation of the third non-photorealistic style. The generator network 310 receives the style feature data 308 and also receives the pose feature data 304 which describes the latent vector representation of the first pose. For instance, the generator network 310 processes the pose feature data 304 and the style feature data 308 to generate a digital object 516. As illustrated, the digital object 516 has the first pose and the third non-photorealistic style and the digital object 516 is visually similar to a ground truth digital object 518 which has the first pose and the third non-photorealistic style.

Finally, the representation 500 includes a digital object 520 that has a fourth pose and a fourth non-photorealistic style. For example, the encoder network 306 processes the input data 114 which describes a digital image depicting the digital object 520 to generate the style feature data 308. In this example, the style feature data 308 describes a latent vector representation of the fourth non-photorealistic style and the generator network 310 processes the pose feature data 304 and the style feature data 308 to generate a digital object 522. The digital object 522 has the first pose and the fourth non-photorealistic style and is visually similar to a ground truth digital object 524 which has the first pose and the fourth non-photorealistic style.

With reference to FIG. 5B, the representation 502 includes interpolation examples 526-530 which depict digital objects generated by interpolating between non-photorealistic styles on a static frame. This is possible because of the property of the latent space illustrated in the t-SNE visualization 430 which is a result of training the generative adversarial network 300 using the siamese training to minimize the contrastive lost function. For example, the interpolation example 526 interpolates from contours to suggestive contours, the interpolation example 528 interpolates from contours to apparent ridges, and the interpolation example 530 interpolates from apparent ridges to a combination of all three non-photorealistic results.

With respect to FIG. 5C, the representation 504 includes interpolation examples 532-536 that depict digital objects generated by interpolating between non-photorealistic styles across multiple frames. For instance, the interpolation example 532 interpolates contours across the multiple frames in a manner which appears to animate the digital object depicted in the multiple frames. The interpolation example 534 interpolates from contours to suggestive contours across the multiple frames. As shown, the interpolation example 536 interpolates from contours to apparent ridges across the multiple frames.

Figure 6:
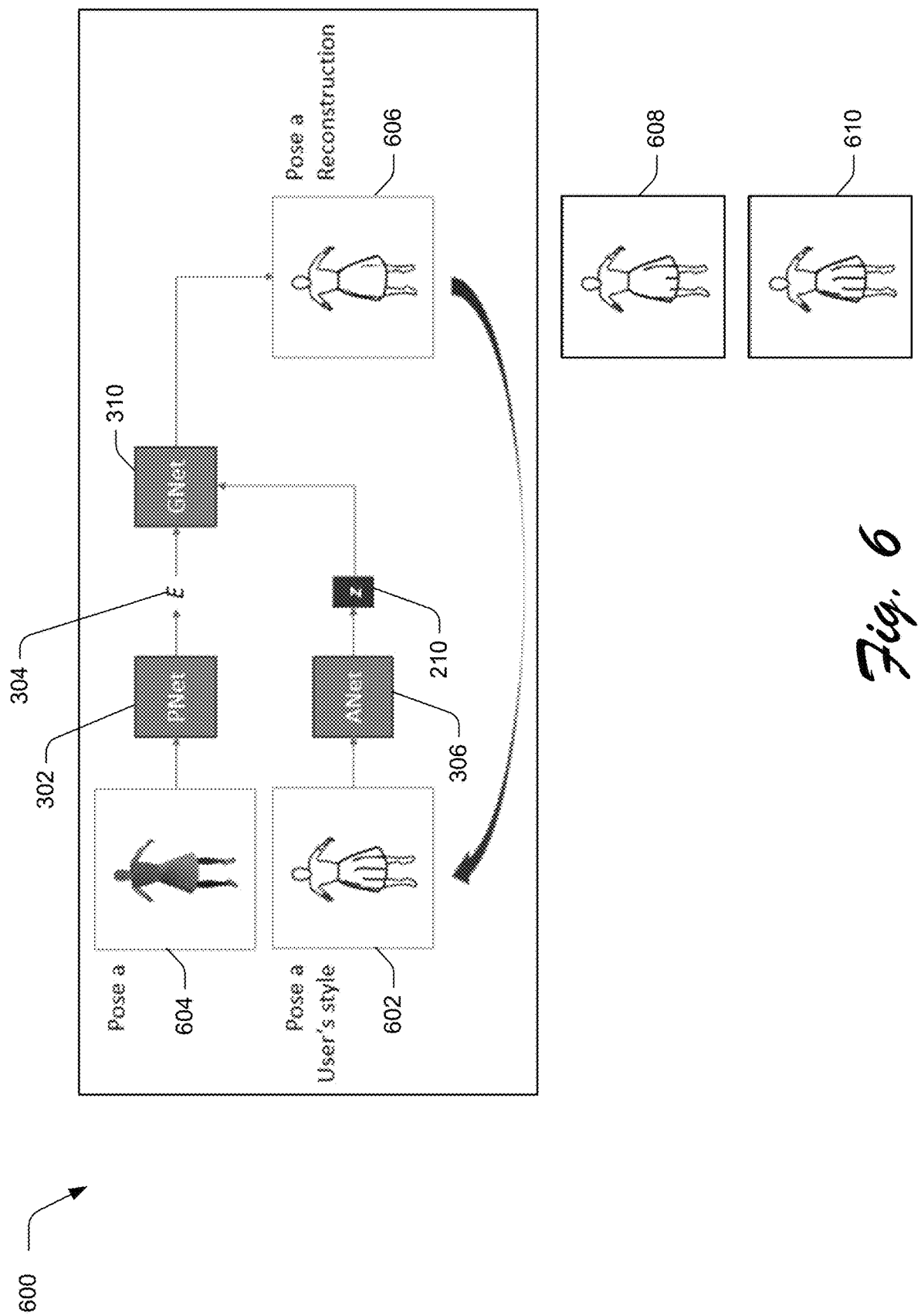
FIG. 6 illustrates a representation of optimizing a latent vector representation of a user defined non-photorealistic style.

FIG. 6 illustrates a representation 600 of optimizing a latent vector representation of a user defined non-photorealistic style. With reference to FIG. 6 and FIG. 2 and after the generative adversarial network 300 is trained on the synthetic training data by the sketch module 110, the encoder module 202 receives the input data 114 describing a user sketched digital object 602. For example, a user interacts with an input device (e.g., a mouse, a stylus, a touchscreen, etc.) relative to the user interface 122 within an interface of an application for sketching animated objects to sketch the user sketched digital object 602 by manipulating the input device. In one example, the user sketches the user sketched digital object 602 relative to a three-dimensional mesh that corresponds to a pose such as a pose of an additional digital object 604.

As illustrated in FIG. 6, the user sketched digital object 602 is a humanlike character that has a user defined non-photorealistic style and a pose "a." In the pose "a," the humanlike character's legs are facing forward and are roughly aligned with the character's shoulders. In the illustrated example, the humanlike character's arms are outstretched in the pose "a." The user defined non-photorealistic style includes dark lines for defining boundaries which are filled using a single light color (e.g., white). For instance, the dark lines also define a texture for a dress worn by the humanlike character in the pose "a." The encoder module 202 processes the user sketched digital object 602 using the encoder network 306 to generate the feature data 210 as describing a latent vector representation of the user defined non-photorealistic style.

The generator module 204 receives the feature data 210 and processes the feature data 210 using the generator network 310 to generate a reconstructed digital object 606. As shown, the reconstructed digital object 606 is a humanlike character that has the pose "a" and a first approximated non-photorealistic style. The first approximated non-photorealistic style is somewhat visually similar to the user defined non-photorealistic style. For example, the first approximated non-photorealistic style also includes dark lines for defining boundaries which are filled using a single light color (e.g., white). However, the first approximated non-photorealistic style only includes a partial dark line defining a partial texture of a dress worn by the humanlike character. The reason for this is because the generative adversarial network 300 is trained to generate the reconstructed digital object 606 based on the training data which is not necessarily visually similar to the user defined non-photorealistic style sketched by the user.

The comparison module 206 receives the object data 212 describing the reconstructed digital object 606 and the input data 114 describing the user sketched digital object 602 and processes the input data 114 and the object data 212 to generate modified feature data 214. To do so, the comparison module 206 compares the reconstructed digital object 606 with the user sketched digital object 602. Since the reconstructed digital object 606 and the user sketched digital object 602 both have the pose "a" in this example, comparing the reconstructed digital object 606 with the user sketched digital object 602 is a comparison between the user defined non-photorealistic style and the first approximated non-photorealistic style.

Based on this comparison, the comparison module 206 determines that the user sketched digital object 602 includes the dark lines defining the texture for the dress but the reconstructed digital object 606 includes the partial dark line defining the partial texture of the dress. For example, the comparison module 206 computes a loss between the user sketched digital object 602 and the reconstructed digital object 606 and modifies the latent vector representation of the user defined non-photorealistic style to minimize the loss. For instance, the comparison module 206 optimizes the latent vector representation of the user defined non-photorealistic style in this manner and generates the modified feature data 214 as describing the modified latent vector representation of the user defined non-photorealistic style. In an example, the comparison module 206 does not modify weights of the generative adversarial network 300 learned from training the generative adversarial network 300 on the training data as part of modifying the latent vector representation of the user defined non-photorealistic style.

As shown in FIG. 2, the generator module 204 receives the modified feature data 214 and processes the modified feature data 214 using the generator network 310 to generate a reconstructed digital object 608. The reconstructed digital object 608 is a humanlike character having the pose "a" and a second approximated non-photorealistic style. As shown in FIG. 6, the second approximated non-photorealistic style is more visually similar to the user defined non-photorealistic style than the first approximated non-photorealistic style of the reconstructed digital object 606. For example, the partial dark line defining the partial texture of the dress worn by the humanlike character included in the reconstructed digital object 606 is a complete dark line in the reconstructed digital object 608 which is visually indistinguishable from a corresponding dark line included in the user sketched digital object 602.

However, the second approximated non-photorealistic style is still visually distinguishable from the user defined non-photorealistic style. For instance, the second approximated non-photorealistic style includes additional partial dark lines which are complete dark lines in the user defined non-photorealistic style. The generator module 204 generates the object data 212 as describing the reconstructed digital object 608. As illustrated in FIG. 2, the comparison module 206 receives the object data 212 describing the reconstructed digital object 608 and the input data 114 describing the user sketched digital object 602. The comparison module 206 computes a loss between the user sketched digital object 602 and the reconstructed digital object 608 and modifies the latent vector representation of the user defined non-photorealistic style to minimize the loss. The comparison module 206 generates the modified feature data 214 as describing the modified latent vector representation of the user defined non-photorealistic style. Again, the comparison module 206 does not modify the weights learned from training the generative adversarial network 300 on the training data as part of modifying the latent vector representation of the user defined non-photorealistic style in this example.

The generator module 204 receives the modified feature data 214 and processes the modified feature data 214 using the generator network 310 to generate a reconstructed digital object 610. The reconstructed digital object 610 is a humanlike character having the pose "a" and a third approximated non-photorealistic style. As shown, the third approximated non-photorealistic style is visually similar to the user defined non-photorealistic style. For instance, the reconstructed digital object 610 is not visually distinguishable from the user sketched digital object 602.

The generator module 204 generates the object data 212 as describing the reconstructed digital object 610. The comparison module 206 receives the object data 212 and the input data 114 and determines that a loss between the user sketched digital object 602 and the reconstructed digital object 610 is minimized. Accordingly, the comparison module 206 generates the modified feature data 214 as describing an optimized latent vector representation of the user defined non-photorealistic style. For example, the sketch module 110 is capable of leveraging the optimized latent vector representation of the user defined non-photorealistic style to interpolate between the user sketched digital object 602 and another digital object such as another user sketched digital object. For instance, the sketch module 110 is also capable of leveraging the optimized latent vector representation to propagate learned styles across multiple frames to generate digital objects having the user defined non-photorealistic style and many different poses.

The display module 208 receives and processes the modified feature data 214 using the generator network 310 to generate the reconstructed digital object 610 for display in the user interface 122. For example, the user interacts with the input device relative to the user interface 122 within the interface of the application for sketching animated objects to propagate the user defined non-photorealistic style across multiple frames and generate multiple digital objects having the user defined non-photorealistic style and a variety of different poses. In this example, the multiple digital objects are combinable to animate the humanlike character depicted by the user sketched digital object 602. For instance, the sketch module 110 leverages the optimized latent vector representation of the user defined non-photorealistic style to generate the digital objects included in the interpolation example 532 having the user defined non-photorealistic style.

Figure 7B:
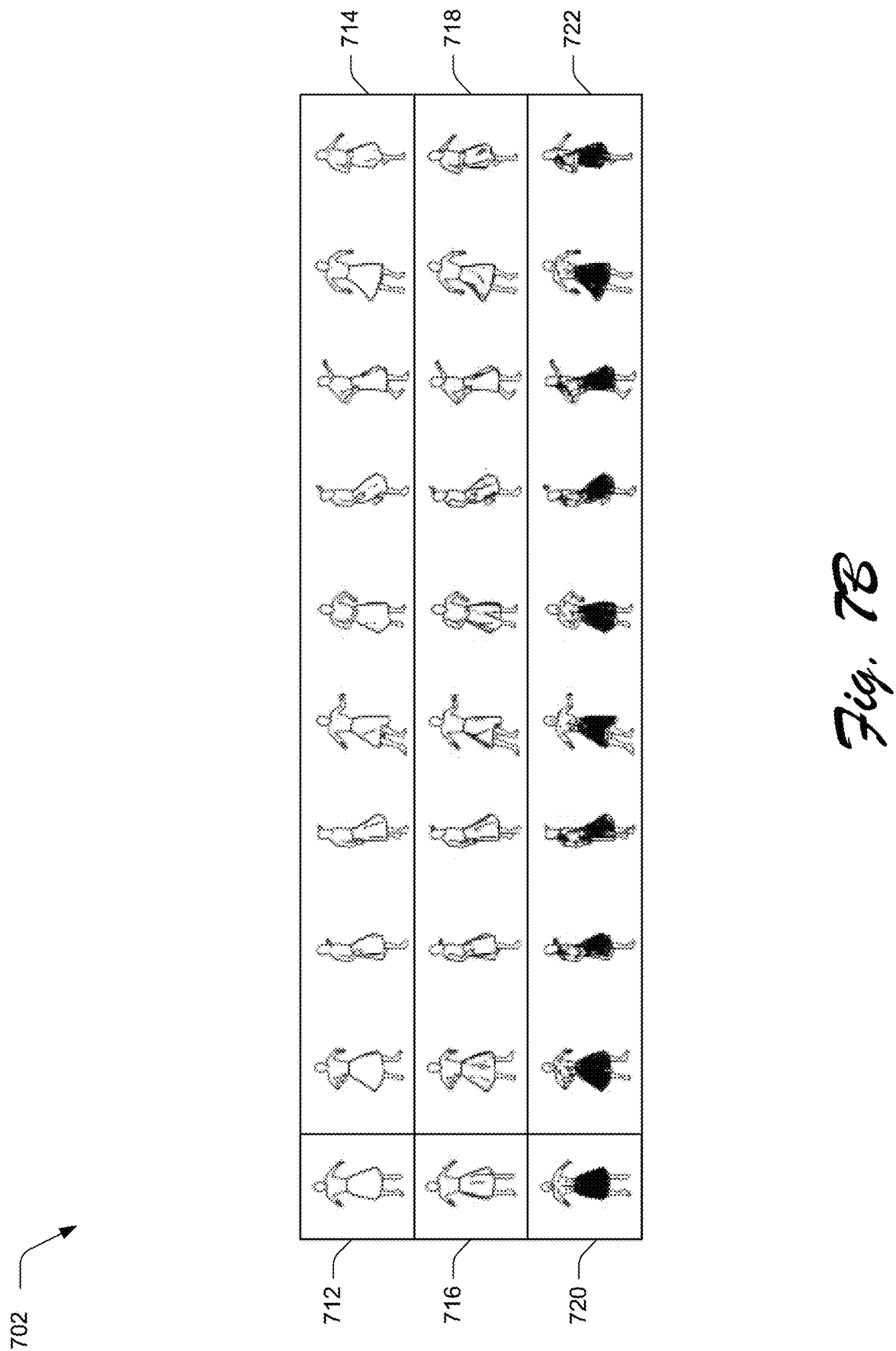

FIGS. 7A and 7B illustrate examples of generating digital objects to animate sketches. FIG. 7A illustrates a representation 700 of interpolation between user defined non-photorealistic styles on a static frame. FIG. 7B illustrates a representation 702 of interpolation between user defined non-photorealistic styles across multiple frames. The representation 700 includes a user sketched digital object 704 which has a first user defined non-photorealistic style. For example, a user interacts with an input device (e.g., a touchscreen, a mouse, a stylus, etc.) relative to the user interface 122 within an interface of an application for sketching animated objects to sketch the user sketched digital object 704.

As shown, the first user defined non-photorealistic style of the user sketched digital object 704 includes a single dark line indicating a texture of a dress worn by a character that is depicted by the user sketched digital object 704. For example, the sketch module 110 receives the input data 114 describing the user sketched digital object 704. In this example, the sketch module 110 processes the input data 114 using the encoder network 306 to generate the feature data 210 as describing a latent vector representation of the first user defined non-photorealistic style. The sketch module 110 optimizes the latent vector representation of the first user defined non-photorealistic style by generating a reconstructed digital object using the generator network 310 and modifying the latent vector representation of the first user defined non-photorealistic style to minimize a loss between the reconstructed digital object and the user sketched digital object 704. For instance, the sketch module 110 leverages the optimized latent vector representation of the first user defined non-photorealistic style to generate an interpolation example 706.

The interpolation example 706 depicts digital objects generated by interpolating the user sketched digital object 704 on the static frame. For instance, the sketch module 110 generates the digital objects included in the interpolation example 706 as having a same pose as the user sketched digital object 704. As shown, each of the digital objects included in the interpolation example 706 is both aesthetically pleasing and visually similar to the user sketched digital object 704. For example, each of the digital objects included in the interpolation example 706 has the single dark line indicating the texture of the dress. Thus, each of the digital objects included in the interpolation example 706 has the first user defined non-photorealistic style.

The representation 700 also includes a user sketched digital object 708 which has a second user defined non-photorealistic style. As illustrated, the second user defined non-photorealistic style includes multiple dark lines indicating a texture of a dress worn by a character depicted by the user sketched the digital object 708, multiple dark lines on an abdomen of the character, and a dark line on a face of the character. Accordingly, the second user defined non-photorealistic style is more complex than the first user defined non-photorealistic style which includes the single dark line. For instance, the sketch module 110 receives the input data 114 describing the user sketched digital object 708 and the sketch module 110 processes the input data 114 using the encoder network 306 to generate the feature data 210 as describing a latent vector representation of the second user defined non-photorealistic style.

As in the previous example, the sketch module 110 optimizes the latent vector representation of the second user defined non-photorealistic style by generating a reconstructed digital object using the generator network 310 and modifying the latent vector representation of the second user defined non-photorealistic style to minimize a loss between the reconstructed digital object and the user sketched digital object 708. The sketch module 110 then leverages the optimized latent vector representation of the second user defined non-photorealistic style to generate an interpolation example 710. As shown, the interpolation example 710 depicts digital objects generated by interpolating the user sketched digital object 708 on the static frame.

While the digital objects included in the interpolation example 710 are visually similar to the user sketched digital object 708, some of these digital objects include fewer dark lines than are included in the user sketched digital object 708. For example, some of the digital objects included in the interpolation example 710 have partial or incomplete dark lines which are complete dark lines in the user sketched digital object 708. A few of the digital objects included in the interpolation example 710 have additional dark lines that are not included in the user sketched digital object 708. These differences are a result of the increased complexity of the second user defined non-photorealistic style compared to the first user defined non-photorealistic style. For example, this increased complexity causes overfitting which the sketch module 110 compensates for in some examples using additional regularization.

With reference to FIG. 7B, the representation 702 includes a user sketched digital object 712. For example, the user interacts with the input device relative to the user interface 122 within the interface of the application for sketching animated objects to sketch the user sketched digital object 712. As shown, the user sketched digital object 712 has a first pose and a first user defined non-photorealistic style. For instance, a character depicted by the digital object 712 is humanlike with extended arms.

The sketch module 110 receives the input data 114 describing the user sketched digital object 712 and processes the input data 114 using the encoder network 306 to generate the feature data 210 as describing a latent vector representation of the first user defined non-photorealistic style. For instance, the sketch module 110 generates a reconstructed digital object by processing the feature data 210 with the generator network 310 and computes a loss between the user sketched digital object 712 and the reconstructed digital object. The sketch module 110 then optimizes the latent vector representation of the first user defined non-photorealistic style to minimize the loss.

The sketch module 110 leverages the optimized latent vector representation of the first user defined non-photorealistic style to generate a propagation example 714 by interpolating or propagating the first user defined non-photorealistic style across multiple frames. To do so in one example, the sketch module 110 generates the style feature data 308 as describing the optimized latent vector representation of the first user defined non-photorealistic style. The sketch module 110 then processes a digital image depicting a digital object having a second pose that is different from the first pose of the user sketched digital object 712 using the encoder network 302. In one example, the sketch module 110 selects the second pose based on the first pose such that a transition from the first pose to the second pose appears as a natural movement of the humanlike character depicted in the user sketched digital object 712.

For example, the encoder network 302 generates the pose feature data 304 as describing a latent vector representation of the second pose. The generator network 310 receives and processes the pose feature data 304 and the style feature data 308 to generate a digital object having the first user defined non-photorealistic style and the second pose. Next, the sketch module 110 process a digital image depicting a digital object having a third pose that is different from the second pose. For instance, the sketch module selects the third pose based on the second pose such that a transition from the second pose to the third pose appears as a natural movement of the humanlike character depicted in the user sketched digital object 712. The encoder network 302 generates the pose feature data 304 as describing a latent vector representation of the third pose. The generator network 310 processes the pose feature data 304 and the style feature data 308 to generate a digital object having the first user defined non-photorealistic style and the third pose. The sketch module 110 continues to generate additional digital objects having the first user defined non-photorealistic style and poses which appear to naturally transition from a pose of a most recently generated digital object.

As shown, the propagation example 714 includes nine generated digital objects that each have the first user defined non-photorealistic style and a different pose. For example, because the sketch module 110 selects these different poses in a manner which appears to transition from a previous pose, the character depicted in the user sketched digital object 712 appears animated in the propagation example 714. In this way, the user interacts with the input device to sketch the first user defined non-photorealistic style relative to a keyframe and the sketch module 110 generates the nine digital objects included in the propagation example 714 to animate the character by propagating the first user defined non-photorealistic style across the multiple frames.

Similarly, the representation 702 includes a user sketched digital object 716 having the first pose of the user sketched digital object 712 and a second user defined non-photorealistic style. The sketch module 110 receives the input data 114 describing the user sketched digital object 712 and optimizes a latent vector representation of the second user defined non-photorealistic style as in the previous example. As shown, the sketch module 110 leverages the optimized latent vector representation of the second user defined non-photorealistic style and the pose feature data 304 describing the latent vector representations of the poses of the digital objects included in the propagation example 714 to generate a propagation example 718. For example, the sketch module 110 generates the propagation example 718 by propagating the second user defined non-photorealistic style across the multiple frames. In the illustrated example, the propagation example 718 includes nine generated digital objects that each have the second user defined non-photorealistic style and a different pose. The poses of the nine generated digital objects included in the propagation example 718 correspond to the poses of the nine generated digital objects included in the propagation example 714.

The representation 702 also includes a user sketched digital object 720 having the first pose of the user sketched digital objects 712, 716 and a third user defined non-photorealistic style. As in the previous examples, the sketch module 110 receives the input data 114 describing the user sketched digital object 720 and the sketch module 110 processes the input data 114 to optimize a latent vector representation of the third user defined non-photorealistic style. The sketch module 110 generates the style feature data 308 as describing the optimized latent vector representation of the third user defined non-photorealistic style. The generator network 310 processes the style feature data 308 and the pose feature data 304 describing the latent vector representations of the poses of the digital objects included in the propagation examples 714, 718 to generate a propagation example 722. As shown, nine generated digital objects included in the propagation example 722 each have the third user defined non-photorealistic style and a different pose. The poses of the nine generated digital objects included in the propagation example 722 correspond to the poses of the nine generated digital objects included in the propagation examples 714, 718. Accordingly, a character depicted by the user sketched digital object 720 appears animated in the propagation example 722.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 8:
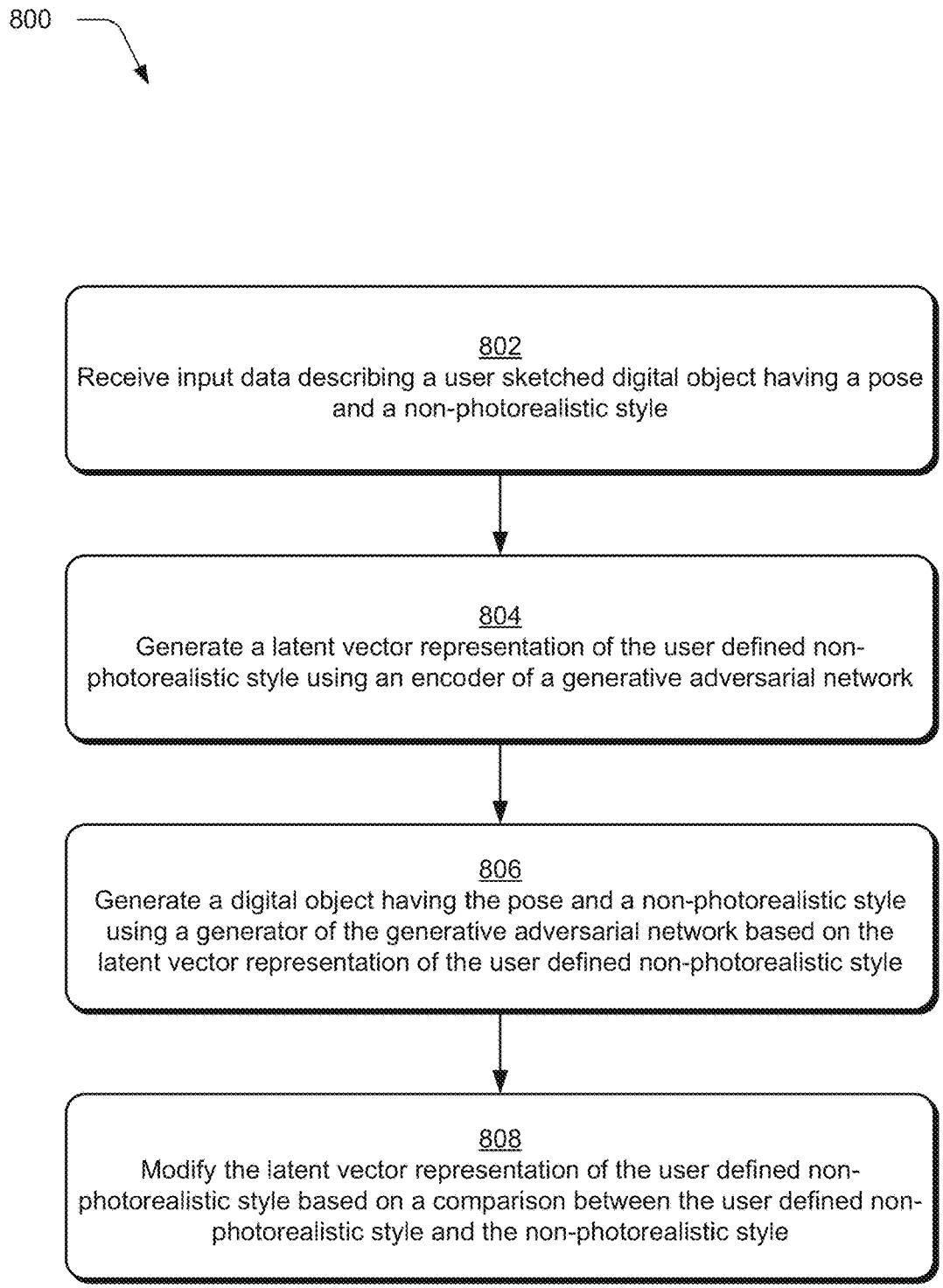
FIG. 8 is a flow diagram depicting a procedure in an example implementation in which a latent vector representation of a user defined non-photorealistic style is modified.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7. FIG. 8 is a flow diagram depicting a procedure 800 in an example implementation in which a latent vector representation of a user defined non-photorealistic style is modified.

Input data is received describing a user sketched digital object having a pose and a non-photorealistic style (block 802). For example, the computing device 102 implements the sketch module 110 to receive the input data. A latent vector representation of the user defined non-photorealistic style is generated using an encoder of a generative adversarial network (block 804). The sketch module 110 generates the latent vector representation of the user defined non-photorealistic style using the encoder in some examples.

A digital object is generated having the pose and a non-photorealistic style using a generator of the generative adversarial network based on the latent vector representation of the user defined non-photorealistic style (block 806). In an example, the computing device 102 implements the sketch module 110 to generate the digital object having the pose and the non-photorealistic style. The latent vector representation of the user defined non-photorealistic style is modified based on a comparison between the user defined non-photorealistic style and the non-photorealistic style (block 808). For example, the sketch module 110 modifies the latent vector representation of the user defined non-photorealistic style.

Example System and Device

Figure 9:
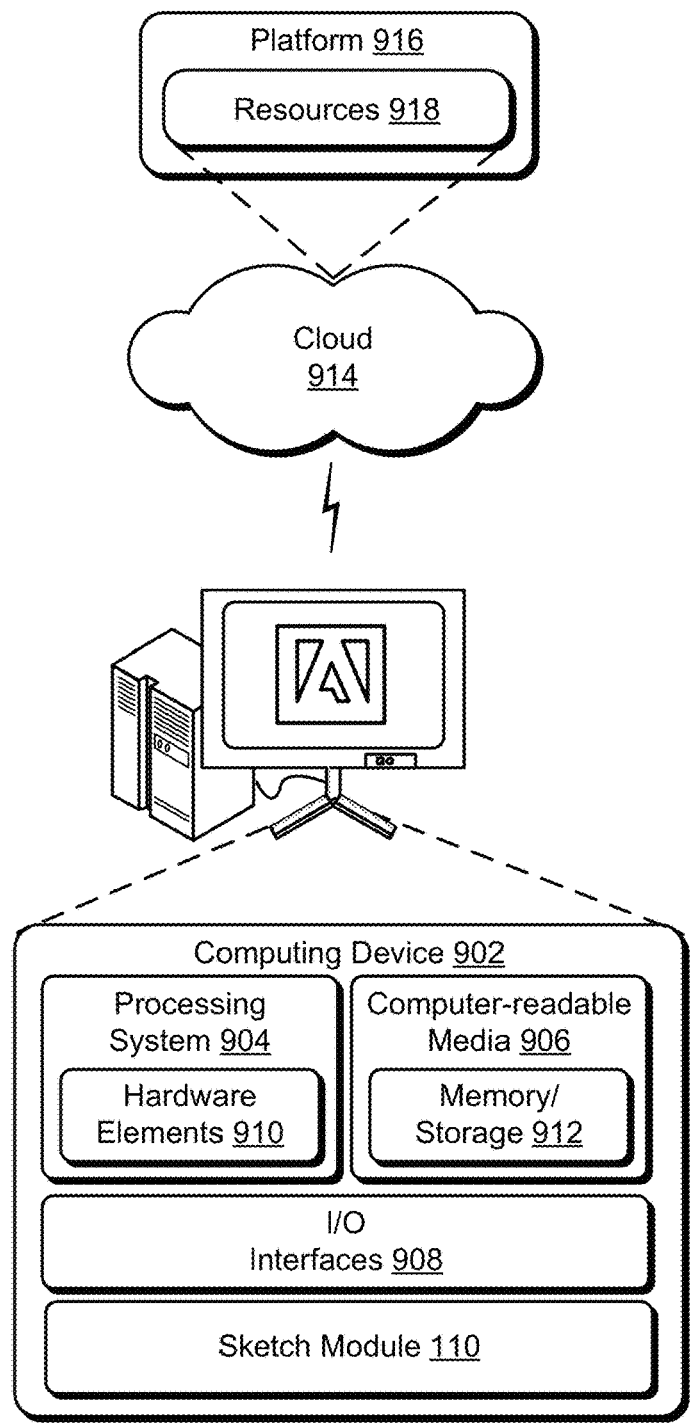
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the sketch module 110. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although implementations of systems for generating digital objects to animate sketches have been described in language specific to structural features and/or methods, it is to be understood that the appended claims are not necessarily limited to the specific features or methods described. Rather, the specific features and methods are disclosed as example implementations of systems for generating digital objects to animate sketches, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device, input data describing a user sketched digital object having a pose and a user defined non-photorealistic style;
generating, by the processing device, a latent vector representation of the user defined non-photorealistic style using an encoder of a generative adversarial network;
generating, by the processing device, a digital object having the pose and a non-photorealistic style using a generator of the generative adversarial network based on the latent vector representation of the user defined non-photorealistic style; and
modifying, by the processing device, the latent vector representation of the user defined non-photorealistic style based on a comparison between the user defined non-photorealistic style and the non-photorealistic style.

2. The method as described in claim 1, further comprising generating an additional digital object having the pose and an additional non-photorealistic style using the generator based on the modified latent vector representation of the user defined non-photorealistic style.

3. The method as described in claim 2, wherein the additional digital object is visually similar to the user sketched digital object.

4. The method as described in claim 1, wherein the generative adversarial network is trained on training data to minimize a contrastive loss function using pairs of training samples described by the training data.

5. The method as described in claim 4, wherein the training samples include contours, suggestive contours, ridges and valleys, or apparent ridges.

6. The method as described in claim 4, wherein the generative adversarial network is trained to minimize a reconstruction loss.

7. The method as described in claim 1, further comprising:
receiving additional input data describing an input digital object having a particular pose;
generating a latent vector representation of the particular pose using an additional encoder of the generative adversarial network; and
generating an additional digital object using the generator that has the particular pose and the user defined non-photorealistic style.

8. The method as described in claim 7, further comprising generating a plurality of digital objects each having a different pose and the user defined non-photorealistic style.

9. The method as described in claim 1, wherein weights learned from training the generative adversarial network on training data are not modified as part of modifying the latent vector representation of the user defined non-photorealistic style.

10. A system comprising:
a memory component; and
a processing device coupled to the memory component, the processing device to perform operations comprising:
receiving input data describing a user sketched digital object having a pose and a user defined non-photorealistic style;
generating a latent vector representation of the user defined non-photorealistic style using an encoder of a generative adversarial network that is trained on training data to receive a first digital object having a first pose and a first non-photorealistic style and a second digital object having a second pose and a second non-photorealistic style as an input and generate a new digital object having the first pose and the second non-photorealistic style as an output;
generating a digital object having the pose and a non-photorealistic style using a generator of the generative adversarial network based on the latent vector representation of the user defined non-photorealistic style; and
modifying the latent vector representation of the user defined non-photorealistic style based on a comparison between the user defined non-photorealistic style and the non-photorealistic style.

11. The system as described in claim 10, wherein the training data describes training samples having contours, suggestive contours, ridges and valleys, or apparent ridges.

12. The system as described in claim 11, wherein the generative adversarial network is trained on the training data to minimize a contrastive loss function using pairs of the training samples.

13. The system as described in claim 10, wherein the generative adversarial network is trained to minimize a reconstruction loss.

14. The system as described in claim 10, wherein the operations further comprise generating an additional digital object having the pose and an additional non-photorealistic style using the generator based on the modified latent vector representation of the user defined non-photorealistic style.

15. The system as described in claim 14, wherein the additional digital object is visually similar to the user sketched digital object.

16. A non-transitory computer-readable storage medium storing executable instructions, which when executed by a processing device, causes the processing computing device to perform operations comprising:
receiving input data describing a user sketched digital object having a pose and a user defined non-photorealistic style;
generating a latent vector representation of the user defined non-photorealistic style using an encoder of a generative adversarial network that is trained on training data to receive a first digital object having a first pose and a first non-photorealistic style and a second digital object having a second pose and a second non-photorealistic style as an input and generate a new digital object having the first pose and the second non-photorealistic style as an output;
generating a digital object having the pose and a non-photorealistic style using a generator of the generative adversarial network based on the latent vector representation of the user defined non-photorealistic style; and
modifying the latent vector representation of the user defined non-photorealistic style based on a comparison between the user defined non-photorealistic style and the non-photorealistic style.

17. The non-transitory computer-readable storage medium as described in claim 16, wherein the training data describes training samples having contours, suggestive contours, ridges and valleys, or apparent ridges.

18. The non-transitory computer-readable storage medium as described in claim 17, wherein the generative adversarial network is trained on the training data to minimize a contrastive loss function using pairs of the training samples.

19. The non-transitory computer-readable storage medium as described in claim 16, wherein weights learned from training the generative adversarial network on the training data are not modified as part of modifying the latent vector representation of the user defined non-photorealistic style.

20. The non-transitory computer-readable storage medium as described in claim 16, wherein the generative adversarial network is trained to minimize a reconstruction loss.

* * * * *